Patented June 8, 1937

2,083,098

UNITED STATES PATENT OFFICE 2,083,098

PARASITICIDAL COMPOSITION

Alwyn C. Sessions, New Brunswick, N. J., assignor to California Spray-Chemical Corporation, Berkeley, Calif., a corporation of Delaware No Drawing. Application April 4, 1934, Serial No. 719,042

14 Claims. (Cl. 167—16)

This invention relates to a new and improved fungicide and more particularly to a composition in which the active fungicidal ingredient is a copper-calcium silicate complex.

Copper in numerous insoluble or slightly soluble compounds has long been recognized as a highly effective fungicide and has enjoyed widespread usage in horticultural sprays. By far the most widely employed such copper spray is the one commonly known as Bordeaux mixture, a variable copper basic sulfate admixed with some calcium sulfate which results from the interaction of dilute solutions of copper sulfate and calcium hydroxide.

When such copper combinations have been applied with a considerable excess of lime to such horticultural hosts as are known to be fairly resistant to copper injury, quite satisfactory control of a wide variety of fungus growth has been obtained. It is, however, well known that certain plants and trees are particularly susceptible to copper and cannot in general be successfully treated with the usual copper compositions. It is with materials especially useful in the spray treatment of this latter group of potential fungus hosts that the present invention is concerned.

There is a well substantiated theory to the effect that copper damage to the living host is occasioned through excess acidity developed during the biological activities of the host and of the fungus in coaction with the various atmospheric agencies. This acidity when allowed to develop apparently brings sufficient copper into solution to effect a partial coagulation of the protoplasm of certain cells which becomes evident as foliage burn and fruit russeting. Thus it is that copper oxide, highly insoluble in water but quite sensitive to even traces of acid is particularly inapplicable as an anticryptogamic agent.

To counteract the development of acidity after the spray has been applied to the infested host it has been customary to employ large excesses of lime in the various Bordeaux formulae where as much as eight pounds of lime have been used per pound of copper sulfate when one pound is actually sufficient to precipitate 4.4 pounds of ordinary copper sulfate. Since, however, lime is rapidly converted to carbonate by the carbon dioxide of the atmosphere even these large excesses are sufficient to control developed acidity for only a relatively short time.

While such a thirty-five fold excess of lime may not be particularly objectionable in itself it has very undesirable consequences in certain combination sprays which it may from time to time be desirable to use. For instance, it very materially decreases the efficiency of such insecticides as lead arsenate, it absorbs the oil from oil sprays thereby reducing their ovacidal efficiency, it increases the volatilization of nicotine from nicotine containing sprays to the point that they remain effective for but a few hours and are thus rendered ineffective against such chewing insects as the codling moth. The pronounced alkalinity of the customary Bordeaux sprays introduces still further disadvantage in that they are thus rendered incompatible with the contact insecticides such as pyrethrum and rotenone.

It is the broad object of this invention to provide an active copper fungicide which will have none of these disadvantages.

It is an object of this invention to provide an anticryptogamic copper containing material which is substantially non-injurious to verdant vegetation.

It is another object of this invention to provide a copper fungicide which is inexpensive and is easy of preparation.

It is still another object of my invention to provide a copper fungicide which is substantially neutral and which remains so when applied to an infected host.

It is a further object of this invention to provide a fungicidally active copper compound which is highly insoluble in dilute acids.

Another object of this invention is to provide a fungicidal copper composition having a relatively high proportion of copper.

Still other objects of the invention will be readily apparent from the following description and discussion.

It is well known that a relatively insoluble calcium silicate will form when a solution of sodium silicate is added to a solution of calcium hydroxide. It is however not well known that this supposedly inactive compound will, when freshly prepared from relatively dilute solutions, readily form an insoluble complex with copper from a copper salt solution. I have discovered that such is the fact and further that the complex so formed has a rare combination of the properties required of a satisfactory copper fungicide.

An idea of the composition of this copper calcium silicate complex may be obtained from the fact that the amount of copper combined is substantially equal to the amount which would be precipitated by the amount of silicate used in preparing the calcium silicate plus an amount substantially equal to that which would be precipitated by the lime similarly used. That is, 75 pounds of calcium hydroxide will react with 250 pounds of copper sulfate pentahydrate, 1500 pounds of sodium silicate solution. "S" grade containing 31.1% solids with a $Na_2O:SiO_2$ ratio of 1:3.86 will react with 250 pounds copper sulfate pentahydrate and 74 pounds of calcium hydroxide when reacted with 1500 pounds of the sodium silicate solution in 250 gallons of water will when subsequently thoroughly agitated therewith precipitate 500 pounds of copper sulfate. The copper containing precipitate thus formed is not merely a mechanical mixture of calcium silicate and copper hydroxide as would be the case if the calcium silicate were, due to its insolubility, to play no further part in the reaction since twice as much copper has been precipitated as would then be possible.

This apparent copper complex with calcium silicate is a perfectly homogeneous and uniform gel which while highly lyophylic in character may be collected by ordinary filtration from either hot or cold solution though as is often the case with hydrophylic substances filtration is somewhat easier from a hot solution. The collected precipitate may be used as such or it may in certain instances be desirable to wash it more or less free of associated soluble salts. The washed or unwashed gel may be preserved in paste form for subsequent incorporation in spray compositions as desired or it may be dried and ground for subsequent use as a powder either in a wet spray or in a dust application.

By properly adjusting the calcium hydrate to sodium silicate ratio a permanently neutral and hence a permanently stable copper fungicide may be produced. The copper content of this product may be varied by employing different types of sodium silicate and various ratios of calcium hydrate to sodium silicate. It is thus readily possible to produce copper calcium silicate complexes containing from 10 to 30% of copper. A complex containing even such lower proportion of copper is possessed of a surprisingly high fungicidal potency and the compositions carrying the higher concentration have proven to be remarkably free from injurious action on plant foliage.

It would appear that this high degree of safety is to be ascribed to a proper balance between the buffering action of the silicate radical, and the solubility of the complex as a whole.

The rather remarkable buffer action and resultant acid stability of the complex is evidenced by the following simple tests: The addition of 0.03 cc. of tenth normal hydrochloric acid to 50 cc. of ordinary tap water will change its pH from 7.0 to 5.8. If 0.2–0.5 gram of the substantially neutral dry copper calcium silicate powder is placed in 50 cc. of the same tap water the pH of the solution will be 7.0–7.2. To reduce this to pH 5.8 will require approximately 7 cc. of the tenth normal acid, more than 200 times as much as in the absence of the complex, and even with this relatively large amount of acid, copper is brought into solution less than 5 parts of copper per million. When copper hydroxide or black copper oxide was similarly treated it was found that 1.6 cc. of acid reduced the pH to 5.3 and brought 160 parts per million of copper into solution.

In order to determine the foliage damage produced by a copper calcium silicate complex for comparison with that produced by the ordinary copper containing sprays a material containing 25% of copper was produced by combining 20 pounds of sodium silicate, "K" grade (42.2% solid, $Na_2O:SiO_2=1:2.84$), with 7 pounds of hydrated lime and reacting the resultant product with the maximum possible amount of copper sulfate. Peach trees which are known to be particularly susceptible to copper injury were sprayed with a 1—3—50 Bordeaux mixture and with a quantity of the complex sufficient to give a copper content equal to the Bordeaux when suspended in water. The ratio of defoliation was 90 for the Bordeaux to 35 for the complex copper calcium silicate. While the spray application here used was much heavier than would ever be employed in commercial operation, the showing of relatively greater safety in the use of this new copper complex is significant.

Because of the high proportion of copper contained in the copper calcium silicate and the physical characteristics of the product, it is especially adapted for use in combination with oil emulsion sprays and has been found to be entirely compatible therewith.

In a 1—3—50 Bordeaux mixture, which is the lowest concentration recommended for spray purposes, there are 2 pounds of copper sulfate and 6 pounds of hydrated lime, a total of approximately 8 pounds of solids per 100 gallons of spray. According to official recommendation by the New Jersey Agricultural Experiment Station the highest permissible content of solids for use in combination with oil sprays should not exceed 5 pounds per 100 gallons of liquid since greater quantities of solid will absorb sufficient of the oil to materially lessen the ovacidal effectiveness of the spray. Herein lies a particular advantage of my new composition since but 2 pounds of solid per 100 gallons are required to give the recommended copper content.

Another outstanding advantage of my composition lies in that through it a copper fungicide which is neutral or of any desired degree of alkalinity and is yet stable and non-injurious to vegetation during long periods of exposure to the elements may be prepared. The possibility of substantial freedom from excess alkalinity makes it readily compatible with rotenone, pyrethrum and nicotine containing compositions and thus of wide usefulness in combination insecticidal and fungicidal applications. It has, for instance, been found that this copper calcium silicate complex does not interfere with codling moth control by nicotine preparations whereas, as is well known, Bordeaux mixtures are not at all suitable for use in this connection.

While the example which has been given for purposes of illustration was one in which amounts of lime and silicate solution were used which were substantially equal in precipitating power for copper, this ratio is not essential to the operability of my invention and other ratios might under certain conditions prove more desirable. If a copper precipitating power sufficient to precipitate all of the copper from solution is taken as 1.0 then the example previously given might be defined as having employed lime to a copper equivalence of 0.5 and silicate solution to a copper equivalence of 0.5. In general, it may be said that marked improvement over the older Bordeaux preparations will be observed with preparations employing silicate at a copper equivalence of about 0.1 and above wherein the lime would then be at about 0.9 copper equivalence and below. This improvement would then be found to increase roughly in proportion to the copper equivalence provided by the silicate the upper limit in most cases being determined by relative cost of ingredients though in certain cases the availability of the copper in relation to the particular nature of the host to be treated will control the ratio to be used.

Likewise, in the foregoing illustrative example, I have employed a particular method for precipitating the complex copper-calcium, silicate-containing composition which includes first precipitating calcium silicate. While such procedure appears to yield a highly desirable product, my invention is not limited thereto since undoubtedly a considerable part of the advantage which I have discovered to reside in the inclusion of an appreciable proportion of silicate radical in a copper-calcium fungicide could be realized regardless of the manner in which precipitation is brought about.

For instance, if the ordinary copper basic sulfate is prepared according to the usual procedure for making Bordeaux mixture, avoiding too large excesses of lime, and a soluble silicate is then added in an amount equal to 10% or more by weight of the lime employed and agitation is continued until equilibrium is substantially established, a product which is markedly superior to the simple Bordeaux mixture will be obtained. While it is easily demonstrable by analysis that such a product will contain copper, calcium, silicate and sulfate, I have not as yet been able to determine whether or not they are combined in the same form as when the calcium silicate is first precipitated as in my preferred procedure. In any event, a superiority in action over the hitherto employed copper fungicidal compositions is unmistakable and is roughly proportional to the amount of silicate employed.

Having now described the chemical nature of my new copper fungicide, its method of preparation and use, what I claim is:

1. A hydrophylic complex copper-calcium silicate gel, which is highly insoluble in water, dries to a chalk-like solid which is easily ground to a free floating powder and is substantially non-injurious to verdant vegetation.

2. A copper-calcium silicate complex precipitated from aqueous solution as a hydrophylic gel and dried to a soft, pulverulent, chalk-like solid.

3. A hydrophylic copper-calcium complex which is highly insoluble in water and dilute acid, which is an active fungicide, which is substantially non-injurious to verdant vegetation, which is formed in aqueous suspension as a gelatinous mass that can be dried to an easily pulverizable solid and in which at least 10% of the electronegative component consists of a silicate.

4. A hydrophylic complex copper-calcium silicate prepared by reacting a soluble copper salt with an aqueous suspension of recently precipitated calcium silicate.

5. A parasiticidal composition comprising a copper Bordeaux mixture in which a silicate radical has been incorporated in amount equivalent to at least 10% of the copper.

6. A parasiticidal composition comprising a substantially neutral complex copper-calcium, silicate containing, hydrophile.

7. A parasiticidal composition comprising a water insoluble copper-calcium, silicate containing complex, substantially non-injurious to verdant vegetation, in suspension and an insecticidal mineral oil in dispersed form.

8. A parasiticidal composition comprising a neutral copper-calcium, silicate containing complex and a botanical insecticide selected from the group consisting of rotenone, pyrethrum and nicotine.

9. The method of producing a water insoluble copper fungicide which consists in reacting calcium hydrate, copper sulfate and a soluble silicate in dilute solution.

10. The method of producing a water insoluble complex copper fungicide which consists in reacting calcium hydrate, a soluble silicate and copper sulfate in dilute solution and subsequently removing excess water from the precipitated gel.

11. The method of producing a copper fungicide which consists in intermixing dilute solutions of hydrated lime and sodium silicate thereby forming an insoluble calcium silicate in dilute suspension and in reacting a copper salt in solution with said suspension under vigorous agitation.

12. The method of producing a copper fungicide which consists in intermixing dilute solutions of hydrated lime and sodium silicate thereby forming an insoluble calcium silicate in dilute suspension, in reacting copper sulfate in solution with said suspension under vigorous agitation and of collecting the resultant copper containing gel and removing excess water therefrom.

13. The method of producing a water insoluble copper containing complex, useful as a fungicide, which consists in precipitating copper from dilute solution through reacting therewith hydrated lime and sodium silicate of which the sodium silicate constitutes at least 0.1 of the copper equivalence, in collecting the so precipitated copper containing gel and removing excess water therefrom.

14. The process of disinfecting parasite infested vegetable hosts which comprises treating them with the insoluble reaction products resulting from the interaction of lime, a soluble silicate and a soluble copper salt in the presence of water.

ALWYN C. SESSIONS.